United States Patent Office 3,046,142
Patented July 24, 1962

---

3,046,142
WHEAT GERM PROCESS
Kenneth M. Gaver, Preville, Quebec, Eduard G. Adamek, Brockville, Ontario, and Alfred M. Barton, Montreal, Quebec, Canada, assignors to The Ogilvie Flour Mills Company, Limited, Montreal, Quebec, Canada, a corporation of Canada
No Drawing. Filed July 13, 1959, Ser. No. 826,443
2 Claims. (Cl. 99—153)

The instant invention relates to an improved wheat germ product and method for producing it. More specifically, it relates to wheat germ having superior flavor and odor, and prolonged shelf life.

Wheat germ is a widely used food specialty; however, its popularity has been limited to a certain extent because of relatively short shelf life, and/or because many people find its beany taste unpleasant. After contact with air at room temperature for several weeks, wheat germ begins to deteriorate, changing color slightly and developing an unpleasant rancid taste and odor.

It is an object of the instant invention to provide a new type of wheat germ having improved flavor, odor, and prolonged shelf life.

It is a further object of the instant invention to provide a method for stabilizing wheat germ against fermentation, rancidity, and discoloration.

It is a further object of the instant invention to provide a novel wheat germ, having an agreeable taste rather than an objectionable beany taste and a fresh cereal odor even after months of storage.

It is a further object of the instant invention to provide methods for reacting fresh wheat germ with an epoxy compound, such as propylene oxide, to obtain a new type wheat germ having different physical characteristics.

These and other objects of the instant invention will become more apparent from the description and claims that follow.

We have discovered that an improved tasting wheat germ which is stabilized against rapid deterioration, is produced by exposure of fresh wheat germ to an epoxy compound. This reaction agent must be safe for use in food products as well as reactive under the conditions obtaining. Propylene oxide and ethylene oxide are preferred reaction agents in practicing the instant invention.

In a specific embodiment of the instant invention, fresh wheat germ is placed in a desiccator from which air is subsequently removed by suction. A container of liquid propylene oxide is then connected to the desiccator, and the oxide vapor is allowed to expand into the vacuum at room temperature for between about 24 and about 48 hours or more. The wheat germ absorbs propylene oxide vapor, for example up to about 8%, but generally about 5% by weight of oxide is absorbed by the wheat germ. When the resulting wheat germ was stored for five months, the modified wheat germ had a pleasant taste and a fresh, cereal odor rather than a rancid, fermented unpleasant odor.

The propylene oxide treatment eliminates or nearly eliminates the objectionable beany taste of wheat germ. Apparently, the epoxides react with the beany and bitter flavored substances naturally present in wheat germ, as well as in similar types of cereal products and convert them into palatable, neutral tasting substances.

The instant modified wheat germ contains between about 2% and about 8% its weight of absorbed epoxidizing agent. The great the amount of epoxidizing agent absorbed by the wheat germ, the greater its characteristics are modified. However, this modification occurs gradually rather than abruptly as a greater amount of reacting agent is absorbed. Wheat germ containing between about 2% and about 5%, preferably 5% by weight of reacted epoxy compound is of stable yellow color, and deterioration of its flavor and odor is considerably delayed compared to conventional wheat germ. However, wheat germ containing less than about 2% reacted epoxy compound does not exhibit the improved modified characteristics.

Epoxy compounds suitable for use in practicing the instant invention are propylene oxide and ethylene oxide. Although other reactive epoxy compounds, such as butylene oxide and styrene oxide react with wheat germ and modify its properties, substantial amounts of these substances are believed undesirable in food products. We know of no other type of liquid or gaseous agent which will modify wheat germ so that its objectionable beany taste is eliminated and which stabilizes it against deterioration.

The instant novel wheat germ can also be produced by exposing fresh wheat germ to the vapor of the reacting agent at atmospheric pressure in the presence of air. Although air is a diluent for the vapor, fresh wheat germ is stabilized and modified under these conditions.

For example, a small container of liquid propylene oxide is placed in a larger receptacle containing fresh wheat germ, and the receptacle is stoppered. After standing for about 48 hours or more at room temperature, modified wheat germ is obtained.

In order to more fully illustrate the character of the invention but with no intention of being limited to specific details, the following examples are given:

Example I

A container of 10 ml. of liquid propylene oxide was placed in a 300 ml. wide-necked flask containing fresh wheat germ. The flask was stoppered. After standing 24 hours at room temperature all of the propylene oxide had evaporated, although the total volume of propylene oxide vapor formed would have been far in excess of the volume which would fill the stoppered flask at atmospheric pressure. This excess vapor was absorbed by the wheat germ.

Example II

Into a five liter desiccator was placed 2500 gm. of fresh wheat germ. The wheat germ had a moisture content of about 13%. Air was removed from the desiccator by suction, and a container of liquid propylene oxide was connected thereto. Propylene oxide vapor was allowed to expand into the vacuum at room temperature for about 48 hours, that is until 125 ml. of propylene oxide had evaporated. Since one mole or 58 gm. of propylene oxide vapor occupies 22.4 liters at atmospheric pressure, less than 13 gm. of propylene oxide vapor would fill the desiccator. The remaining 110–112 ml. of evaporated propylene oxide was absorbed by the wheat germ. Based on the weight of the wheat germ, about 5% propylene oxide vapor was absorbed.

The excess propylene oxide was removed by suction, and the resulting wheat germ had a moisture content of 10.5%.

Fresh wheat germ is modified by ethylene oxide vapor using the same procedure as described above except that the reaction is carried out at about 3° C. until the wheat germ has absorbed 5% its weight of ethylene oxide vapor. When ethylene oxide is employed to accomplish the reaction, the reaction is carried out at a temperature slightly below the boiling point of ethylene oxide (B.P. 10.7° C.).

The modified wheat germ was stored for more than five months. One portion was stored in a closed container; a second was stored in an open container at room temperature; a third was stored in an open container at about 100° F. Three samples of conventional untreated wheat germ were stored under identical conditions.

Throughout the entire five month period, the three samples of the instant modified wheat germ maintained their original yellow color, while all of the untreated samples acquired a bleached grayish pink appearance. The treated samples of wheat germ retained a pleasant fresh odor while the corresponding untreated samples assumed a rancid, fermented, unpleasant odor.

The pronounced beany taste of conventional wheat germ is almost eliminated by the instant reaction, and the modified product has a faintly sweet, pleasant taste which does not change upon storing. On the other hand, the untreated wheat germ, particularly those samples stored at room temperature were extremely unpleasant and sour in taste and were considered completely spoiled after only three months.

In summary, a new form of wheat germ is produced by exposing fresh wheat germ to propylene oxide vapor and/or ethylene oxide vapor, preferably until the wheat germ has absorbed about 5% its weight of the oxide. Compared to the conventional type of wheat germ, the instant chemically modified product is stabilized against rapid deterioration in flavor, color, and odor; and it has a different, more pleasant flavor and odor, which will increase its consumer appeal.

Having thus fully described and illustrated the instant invention, what is desired protected by Letters Patent is:

1. Method for modifying wheat germ to substantially eliminate its beany taste, make it more appetizing and to increase its shelf life comprising exposing fresh wheat germ in a substantially air-free anhydrous system to the vapor of an epoxy compound selected from the group consisting of ethylene oxide, and propylene oxide and mixtures thereof, until the resulting wheat germ contains between about 2% and 5% by weight of reacted epoxy compound.

2. Method for stabilizing wheat germ against fermentation and deterioration and for improving its flavor and odor which comprises exposing fresh wheat germ in a substantially air-free, anhydrous system to propylene oxide vapor until the resulting wheat germ contains about 5% by weight reacted propylene oxide.

References Cited in the file of this patent

UNITED STATES PATENTS

| | | |
|---|---|---|
| 2,189,947 | Griffith et al. | Feb. 13, 1940 |
| 2,879,167 | Grandel | Mar. 24, 1959 |

FOREIGN PATENTS

| | | |
|---|---|---|
| 332,847 | Great Britain | July 31, 1930 |
| 401,941 | Great Britain | Nov. 23, 1933 |

OTHER REFERENCES

"Control of Insect Pests of Grain in Elevator Storage," Farmer's Bulletin 1880, August 1941, U.S.D.A., pages 15–17.